(12) United States Patent
Akiyama et al.

(10) Patent No.: US 10,968,347 B2
(45) Date of Patent: Apr. 6, 2021

(54) WHOLLY AROMATIC LIQUID CRYSTALLINE POLYESTER RESIN

(71) Applicant: JXTG NIPPON OIL & ENERGY CORPORATION, Tokyo (JP)

(72) Inventors: Nozomi Akiyama, Tokyo-to (JP); Hiroshi Matsuura, Tokyo-to (JP)

(73) Assignee: JXTG NIPPON OIL & ENERGY CORPORATION, Tokyo (JP)

(*) Notice: Subject to any disclaimer, the term of this patent is extended or adjusted under 35 U.S.C. 154(b) by 80 days.

(21) Appl. No.: 16/465,678

(22) PCT Filed: Nov. 27, 2017

(86) PCT No.: PCT/JP2017/042448
§ 371 (c)(1),
(2) Date: May 31, 2019

(87) PCT Pub. No.: WO2018/101214
PCT Pub. Date: Jun. 7, 2018

(65) Prior Publication Data
US 2019/0300700 A1    Oct. 3, 2019

(30) Foreign Application Priority Data
Dec. 1, 2016  (JP) .............................. JP2016-234293

(51) Int. Cl.
*C08L 67/04* (2006.01)
*C08K 3/013* (2018.01)
*C08K 7/04* (2006.01)
*C09K 19/38* (2006.01)
*C08G 63/60* (2006.01)
*C08K 3/00* (2018.01)
*C08K 7/00* (2006.01)

(52) U.S. Cl.
CPC .............. *C08L 67/04* (2013.01); *C08G 63/60* (2013.01); *C08K 3/00* (2013.01); *C08K 3/013* (2018.01); *C08K 7/00* (2013.01); *C08K 7/04* (2013.01); *C09K 19/3809* (2013.01); *C08L 2203/206* (2013.01); *C08L 2205/12* (2013.01)

(58) Field of Classification Search
USPC .................................................. 528/271, 272
See application file for complete search history.

(56) References Cited

U.S. PATENT DOCUMENTS 5,015,722 A    5/1991  Charbonneau et al.
8,585,923 B2  11/2013  Yonezawa et al.

FOREIGN PATENT DOCUMENTS

CN    102585184    7/2012
CN    104662064    5/2015
JP    4-225024     8/1992
JP    2012-126842  7/2012
JP    2015-183159  10/2015

(Continued)

OTHER PUBLICATIONS

WO-2018008612-A1 Washino, Gosuke, abstract, Jan. 2018 (Year: 2018).*

(Continued)

*Primary Examiner* — Terressa Boykin
(74) *Attorney, Agent, or Firm* — Wenderoth, Lind & Ponack, L.L.P.

(57) ABSTRACT

Provided is a wholly aromatic liquid crystalline polyester resin having excellent heat resistance and formability. The wholly aromatic liquid crystalline polyester resin comprises structural units represented by the following formulae (I) to (V) as essential structural units,

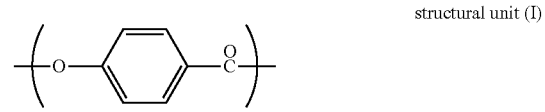
structural unit (I)

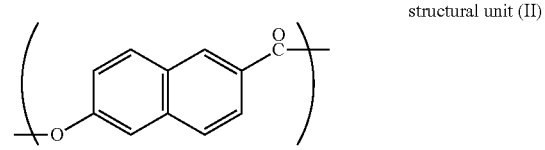

structural unit (II)

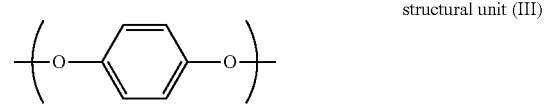

structural unit (III)

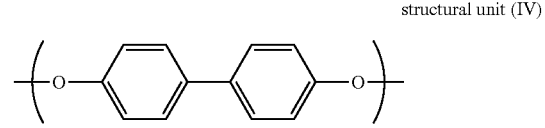

structural unit (IV)

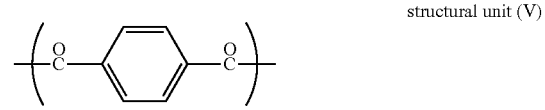

structural unit (V)

wherein the composition ratio (mol %) of the structural units (I) to (V) in the wholly aromatic liquid crystalline polyester satisfies the following conditions: 50 mol %≤structural unit (I)≤75 mol %; 6 mol %≤structural unit (II)≤20 mol %; 1 mol %≤structural unit (III)≤21.5 mol %; 0.5 mol %≤structural unit (IV)≤10.5 mol %; 2.5 mol %≤structural unit (V)≤22 mol %; structural unit (III)>structural unit (IV).

20 Claims, 2 Drawing Sheets

(56) References Cited

FOREIGN PATENT DOCUMENTS

JP          2015183159      * 10/2015   .............. C08L 67/03
WO    WO-2018008612 A1 *  1/2018   ........... C08G 63/605

OTHER PUBLICATIONS

JP-2015183159 Kihara et al. abstract (Year: 2015).*
International Preliminary Report on Patentability dated Jun. 13, 2019 in International Application No. PCT/JP2017/042448.
International Search Report dated Jan. 23, 2018 in International Application No. PCT/JP2017/042448, with English translation.
Office Action dated Nov. 2, 2020 in corresponding Chinese Patent Application No. 201780073088.1, with English Translation.

* cited by examiner

WHOLLY AROMATIC LIQUID CRYSTALLINE POLYESTER RESIN

BACKGROUND OF THE INVENTION

Field of the Invention

The present invention relates to a wholly aromatic liquid crystalline polyester resin. The present invention also relates to a wholly aromatic liquid crystalline polyester resin composition comprising the wholly aromatic liquid crystalline polyester resin, a molded article and an electronic part comprising the composition.

Background Art

Since wholly aromatic liquid crystalline polyester resins have excellent formability and heat resistance, molded articles (for example, an injection molded articles) manufactured by using the wholly aromatic liquid crystalline polyester resins are used in various electronic parts.

In recent years, there has been progress to make the electronic parts in high-integration, thin wall, and low height due to downsizing of personal computers and smart phones, and there has been an increasing need for a molded article having an extremely thin wall thickness. Accordingly, the wholly aromatic liquid crystalline polyester resin is required to have better formability (filling property of thin-walled part) and heat resistance. For example, Patent Document 1 proposes a melt-processable wholly aromatic liquid crystalline polyester resin having an oxybenzoyl moiety as the main constitutive part.

As a method to improve the filling properties, i.e. flowability, of the liquid polymers such as a wholly aromatic liquid crystalline polyester resin, there is carried out, for example, a method to reduce the molecular amount of the liquid polymer to attain low viscosity. However, reduction of the molecular amount of the liquid polymer will cause decrease in the physicalities of the molded article such as the mechanical strength, and also can cause blisters on the surface of the molded article by the reflow treatment performed when the molded article was to be applied to an electronic part such as a connector. For example, Patent Document 2 proposes a wholly aromatic liquid crystalline polyester resin that is capable of suppressing the blisters from generating.

RELATED ART DOCUMENTS

Patent Document

[Patent Document 1] JPH4-225024A
[Patent Document 2] JP2012-126842A

SUMMARY OF THE INVENTION

Problems to be Solved by the Invention

Patent Document 1 describes a preferable embodiment in which a wholly aromatic liquid crystalline polyester resin is consisted of 58 to 62 mol % of oxybenzoyl moiety, 2 to 5 mol % of 6-oxy-2-naphthoyl moiety, 1.5 to 11 mol % of 1,4-dioxyphenylene moiety, 11.5 to 22 mol % of 4,4'-dioxyphenyl moiety, and 16.5 to 20 mol % of dicarboxyaryl moiety, wherein the molar concentration of the 1,4-dioxyphenylene moiety does not exceed the molar concentration of 4,4'-dioxyphenyl moiety. However, the present inventors have found that the wholly aromatic liquid crystalline polyester resin having the composition ratio as described in Patent Document 1 is insufficient in view of improving the formability while maintaining the heat resistance.

Patent Document 2 describes a preferable embodiment in which a wholly aromatic liquid crystalline polyester resin is consisted of 30 to 45 mol % of oxybenzoyl moiety, 3 to 9 mol % of 6-oxy-2-naphthoyl moiety, 13 to 20 mol % of 1,4-dioxyphenylene moiety, 10 to 17 mol % of 4,4'-dioxyphenyl moiety, and 25 to 25 mol % of dicarboxyaryl moiety, wherein the molar concentration of 1,4-dioxyphenylene moiety is higher than the molar concentration of 4,4'-dioxyphenyl. However, the present inventors have found that the wholly aromatic liquid crystalline polyester resin having the composition ratio as described in Patent Document 2 is insufficient in both of the heat resistance and formability and needs improvement.

In order to solve the above described technical problems, the present inventors intensively studied to find that the above-described problem can be solved when a particular structural unit and composition ratio were employed for the structural unit comprised in the wholly aromatic liquid crystalline polyester resin. The present invention has been made based on this finding.

Therefore, the object of the present invention is to provide a wholly aromatic liquid crystalline polyester resin which can achieve excellent formability and heat resistance at the same time.

Means to Solve the Problem

The wholly aromatic liquid crystalline polyester resin of the present invention comprises structural units represented by the following formulae (I) to (V):

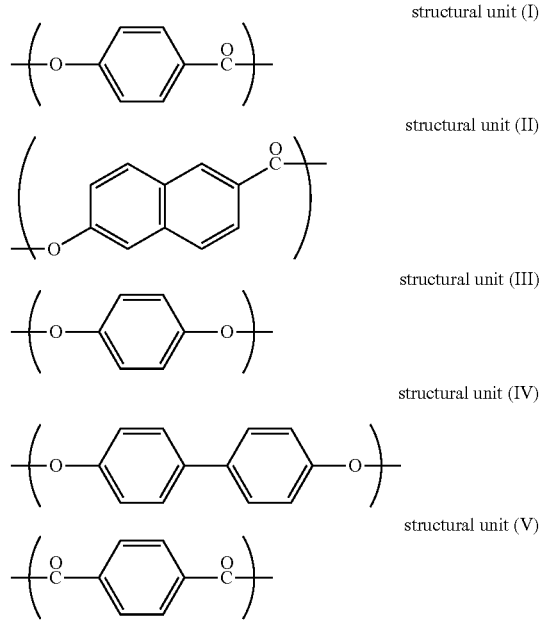

as essential structural units, wherein the composition ratio (mol %) of the structural units (I) to (V) in the wholly aromatic liquid crystalline polyester satisfies the following conditions:

50 mol % ≤ structural unit (I) ≤ 75 mol %
6 mol % ≤ structural unit (II) ≤ 20 mol %

1 mol %≤structural unit (III)≤21.5 mol %
0.5 mol %≤structural unit (IV)≤10.5 mol %
2.5 mol %≤structural unit (V)≤22 mol %
structural unit (III)>structural unit (IV).

In the above-described embodiment, the composition ratio (mol %) of the structural units (I) to (V) in the wholly aromatic liquid crystalline polyester preferably satisfies the following conditions:

55 mol %≤structural unit (I) 70 mol %
7 mol %≤structural unit (II)≤17 mol %
3 mol %≤structural unit (III)≤18 mol %
1 mol %≤structural unit (IV)≤9 mol %
4 mol %≤structural unit (V)≤19 mol %.

In the above-described embodiment, the wholly aromatic liquid crystalline polyester resin composition preferably has a melting point from 320° C. to 355° C.

In the above-described embodiment, the wholly aromatic liquid crystalline polyester resin composition preferably has a supercooling degree of 35° C. or more.

The wholly aromatic liquid crystalline polyester resin composition according to the present invention comprises the above-described wholly aromatic liquid crystalline polyester resin and an inorganic filler.

In the above-described embodiment, the inorganic filler is preferably a fiber-like filler and/or a plate-like filler.

In the above-described embodiment, the content of the inorganic filler is preferably 100 parts by weight or less based on 100 parts by weight of the wholly aromatic liquid crystalline polyester resin contained in the wholly aromatic liquid crystalline polyester resin composition.

The molded article of the present invention comprises the above-described wholly aromatic liquid crystalline polyester resin composition.

The electronic part of the present invention comprises the above-described wholly aromatic liquid crystalline polyester resin composition.

Effect of the Invention

According to the present invention, it is possible to provide a wholly aromatic liquid crystalline polyester resin which can achieve excellent formability and heat resistance at the same time. Use of the polyester resin composition comprising the wholly aromatic liquid crystalline polyester resin will allow manufacture of a molded article having extremely thin-walled part, whereby an electronic part in high-integration, thin wall, and low height can be attained.

There is a problem that the electronic part made in thin wall tends to cause a curvature at the time of the reflow process and produces defect; however, the molded article according to the present invention can suppress the occurrence of the curvature when heated at high temperatures such as the reflow step. Further in addition, there is a problem that in an assembly step of a molded article such as a connector, application of strength to a welded part of the molded article will lead to cracking of the welded part due to the thin wall; however, the molded article according to the present invention has higher strength at the welded part and can suppress the occurrence of cracks.

DETAILED DESCRIPTION OF THE INVENTION

<Wholly Aromatic Liquid Crystalline Polyester Resin>

Figure 1:
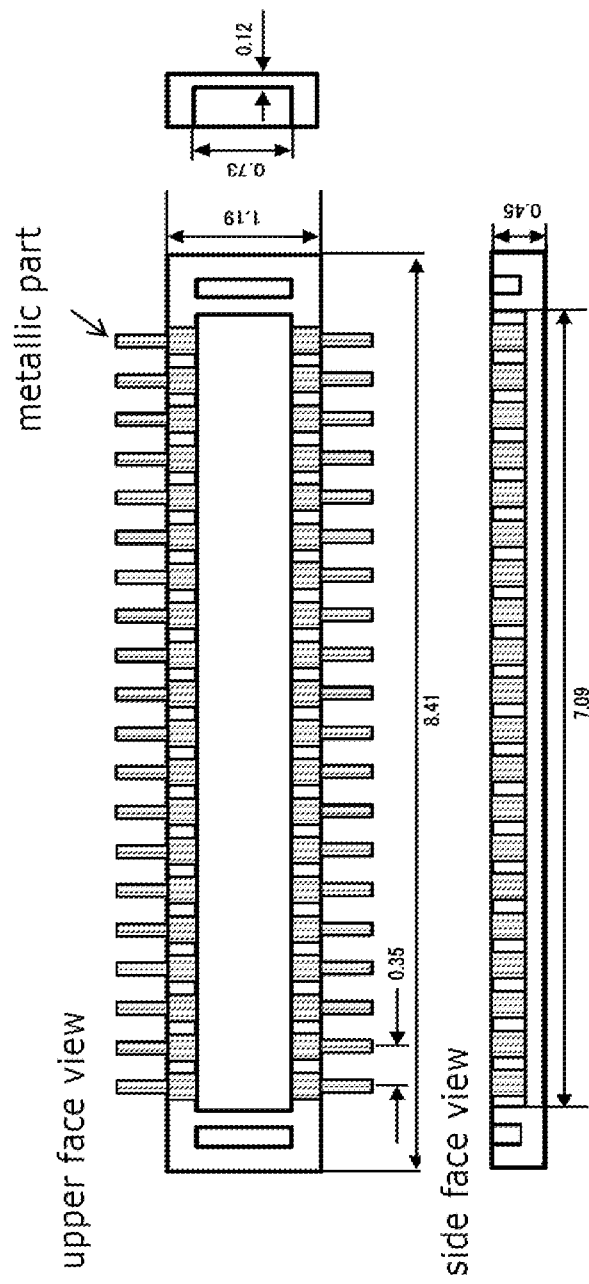
FIG. 1 is a figure of the upper face and the side face of the molded article for measurement of amount of curvature as produced in the Example.

The wholly aromatic liquid crystalline polyester resin according to the present invention comprises structural units represented by the following formulae (I) to (V) as the essential structural units, and the composition ratio (mol %) of the structural units (I) to (V) in the wholly aromatic liquid crystalline polyester satisfy the following conditions. According to such wholly aromatic liquid crystalline polyester resin, it is possible to achieve excellent formability and heat resistance at the same time. Further, it is possible to provide high mechanical strength and blister resistant properties, as well as low curvature properties to a molded article manufactured by using such resin.

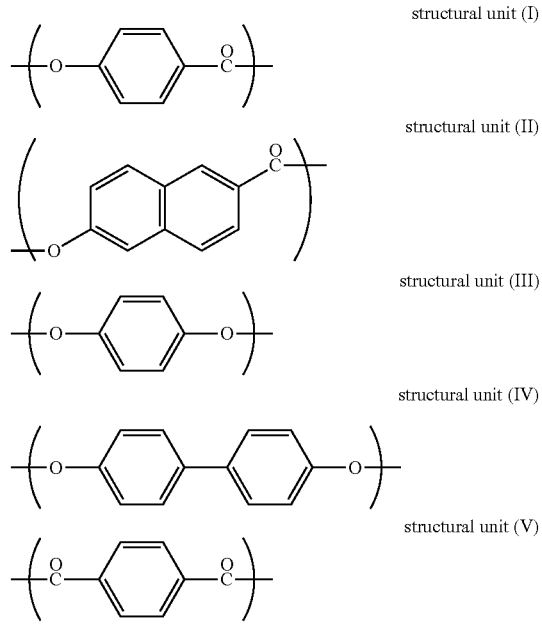

50 mol %≤structural unit (I)≤75 mol %
6 mol %≤structural unit (II)≤20 mol %
1 mol %≤structural unit (III)≤21.5 mol %
0.5 mol %≤structural unit (IV)≤10.5 mol %
2.5 mol %≤structural unit (V)≤22 mol %
structural unit (III)>structural unit (IV).

The composition ratio of the total of structural unit (III) and structural unit (IV) in the wholly aromatic liquid crystalline polyester resin is substantially equivalent to the composition ratio of structural unit (V) (structural unit (III)+structural unit (IV)=structural unit (V)). The total of structural units (I) to (V) is preferably from 95 mol % to 100 mol % and more preferably from 99 mol % to 100 mol %, based on the structural units of the entire wholly aromatic liquid crystalline polyester resin.

The melting point of the wholly aromatic liquid crystalline polyester resin is preferably from 320° C. to 355° C. and more preferably from 325° C. to 350° C. When the melting point is 320° C. or more, it is possible to satisfy the heat resistance required at the time of heat processing for the molded article such as an electronic part. When the melting point is 355° C. or less, the molded article can be easily produced since it is easy to melt.

The melting point is in accordance with ISO11357-3, ASTM D3418 and for example can be measured by using a differential scanning calorimeter (DSC) manufactured by Seiko Denshi Kogyo K. K.

The melting point (° C.) is determined from an endothermic peak obtainable when increasing the temperature from room temperature to 370° C. at a temperature increase rate of 20° C./min, and after the wholly aromatic liquid crystalline polyester resin is completely melted, decreasing the temperature to 50° C. at a rate of 10° C./min, and further increasing the temperature to 420° C. at a rate of 20° C./min.

The supercooling degree of the wholly aromatic liquid crystalline polyester resin is preferably 35° C. or more and more preferably from 35° C. to 60° C. The supercooling degree in the above-described range will make the curing rate slow of the wholly aromatic liquid crystalline polyester resin when producing the molded article, whereby an excellent formability can be attained. Especially when the molded article is manufactured by injection molding, excellent filling properties are attained for the thin-walled part of the metallic mold.

The supercooling degree can be measured, for example, by using a differential scanning calorimeter (DSC) manufactured by Seiko Denshi Kogyo K. K.

The supercooling degree (° C.) is determined from "Tm (° C.)–Tc (° C.)", wherein Tc (° C.) is the crystallization temperature determined from an endothermic peak obtainable when increasing the temperature from room temperature to 370° C. at a temperature increase rate of 20° C./min, and after the wholly aromatic liquid crystalline polyester resin is completely melted, decreasing the temperature to 50° C. at a rate of 10° C./min, and wherein Tm (° C.) is the melting point determined from an endothermic peak obtainable when further increasing the temperature to 420° C. at a rate of 20° C./min.

Each structural unit included in the wholly aromatic liquid crystalline polyester resin is explained below.

(Structural Unit (I))

The wholly aromatic liquid crystalline polyester resin comprises the above-described structural unit (I), and the composition ratio (mol %) of structural unit (I) in the wholly aromatic liquid crystalline polyester is from 50 mol % to 75 mol %. The composition ratio of structural unit (I) is preferably from 55 mol % to 70 mol %, more preferably from 57 mol % to 67 mol %, and further preferably from 60 mol % to 65 mol %.

The monomers that give structural unit (I) are, for example, p-hydroxybenzoic acid (HBA, the following formula (1)), acylated products, ester derivatives, acid halides thereof.

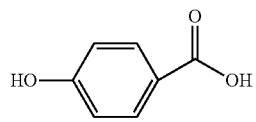

(1)

(Structural Unit (II))

The wholly aromatic liquid crystalline polyester resin comprises the above-described structural unit (II), and the composition ratio (mol %) of structural unit (II) in the wholly aromatic liquid crystalline polyester is from 6 mol % to 20 mol %. The composition ratio of structural unit (II) is preferably from 7 mol % to 17 mol %, more preferably from 9 mol % to 16 mol %, and further preferably from 10 mol % to 15 mol %.

The monomers that give structural unit (II) are, for example, 6-hydroxy-2-naphthoic acid (HNA, the following formula (2)), acylated products, ester derivatives, acid halides thereof.

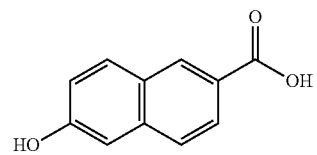

(2)

(Structural Unit (III))

The wholly aromatic liquid crystalline polyester resin comprises the above-described structural unit (III), and the composition ratio (mol %) of structural unit (III) in the wholly aromatic liquid crystalline polyester is from 1 mol % to 21.5 mol %. The composition ratio of structural unit (III) is preferably from 3 mol % to 18 mol %, more preferably from 5 mol % to 15 mol %, and further preferably from 7 mol % to 12 mol %.

The monomers that give structural unit (III) are, for example, hydroquinone (HQ, the following formula (3)) and acylated products thereof.

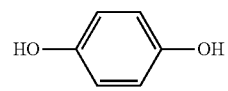

(3)

(Structural Unit (IV))

The wholly aromatic liquid crystalline polyester resin comprises the above-described structural unit (IV), and the composition ratio (mol %) of structural unit (IV) in the wholly aromatic liquid crystalline polyester is from 0.5 mol % to 10.5 mol %. The composition ratio of structural unit (IV) is preferably from 1 mol % to 9 mol %, more preferably from 2 mol % to 8 mol %, and further preferably from 3 mol % to 7 mol %.

The monomers that give structural unit (IV) are, for example, 4,4'-dihydroxybiphenyl (BP, the following formula (4)) and acylated products thereof.

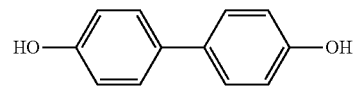

(4)

(Structural Unit (V))

The wholly aromatic liquid crystalline polyester resin comprises the above-described structural unit (V), and the composition ratio (mol %) of structural unit (V) in the wholly aromatic liquid crystalline polyester is from 2.5 mol % to 22 mol %. The composition ratio of structural unit (V) is preferably from 4 mol % to 19 mol Ws, more preferably from 7 mol % to 17 mol Ws, and further preferably from 10 mol % to 15 mol %.

The monomers that give structural unit (V) are, for example, terephthalic acid (TPA, the following formula (5)), ester derivatives and acid halides thereof.

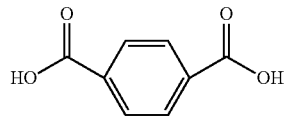

(5)

<Method for Manufacturing Wholly Aromatic Liquid Crystalline Polyester Resin>

The wholly aromatic liquid crystalline polyester resin according to the present invention can be produced by subjecting the monomers represented by the above-described formulae (1) to (5) to polymerization by a conventionally known method.

For example, the wholly aromatic liquid crystalline polyester resin according to the present invention can be produced by only melt polymerization. Production is also possible by preparing a prepolymer by melt polymerization and further subjecting the same to solid phase polymerization.

In view of efficient obtainment of the wholly aromatic polyester compound of the present invention, the monomers represented by the above-described formulae (1) to (5) are combined in a given formulation to 100 mol % and preferably subjected to melt polymerization under acetic acid reflux in the presence of 1.05 to 1.15 mol equivalent of acetic acid anhydride based on the total hydroxyl groups of which the monomers represented by the above-described formulae (1) to (4) have.

When polymerization reaction is performed by a two-step of melt polymerization and the subsequent solid phase polymerization, it is preferable to select a method in which the prepolymer obtained from the melt polymerization is cooled and solidified, comminuted into a powder-form or flake-form, then with a known solid phase polymerization process, e.g. under inert atmosphere such as nitrogen, or vacuum, the prepolymer resin is thermally treated for 1 to 30 hours in the temperature range from 200 to 350° C. The solid phase polymerization may be performed while stirring or in a stand-still state without stirring.

A catalyst may or may not be used in the polymerization reaction. As for the catalyst for use, those conventionally known can be used as the catalyst for polymerization of polyester, including metallic catalysts such as magnesium acetate, tin (I) acetate, tetrabutyl titanate, lead acetate, sodium acetate, potassium acetate, and antimony trioxide, nitrogen-containing heterocyclic compounds, organic compound catalysts such as N-methylimidazole, and the like. Preferably, the amount of catalyst used is without particular limitation, 0.0001 to 0.1 parts by weight based on the total amount of 100 parts by weight of the monomer.

Polymerization reactors in the melt polymerization are not particularly limited, and reactors which are generally used in reaction of highly viscous fluids are used. Examples of those reactors include, stirred tank reactors having stirring units with stirring blades of anchor type, multi-stage type, spiral band type, spiral axis type, or various shapes formed by changing the shapes thereof, or mixing device generally used in kneading resins such as a kneader, a roller mill, and a Banbury mill.

<Wholly Aromatic Liquid Crystalline Polyester Resin Composition>

The wholly aromatic liquid crystalline polyester resin composition according to the present invention comprises the above-described wholly aromatic liquid crystalline polyester resin and an inorganic filler.

The content of the inorganic filler in the wholly aromatic liquid crystalline polyester resin composition is preferably 100 parts by weight or less, more preferably 10 to 70 parts by weight, further preferably 20 to 55 parts by weight, based on 100 parts by weight of the wholly aromatic liquid crystalline polyester resin comprised in the wholly aromatic liquid crystalline polyester resin composition. The content of the inorganic filler within the above-described numerical range will not suppress the filling properties at the time of molding and will allow prevention of the curvature from occurring at the time of producing the molded article.

As for the inorganic filler comprised in the wholly aromatic liquid crystalline polyester resin composition, those in for example, fiber form, plate form, and powder form can be used, which may be used in combination.

Amongst all, preference is made to using the fiber-like filler and plate-like filler in combination.

The inorganic filler includes, for example, glass fibers, milled glass, silica alumina fibers, alumina fibers, carbon fibers, aramid fibers, potassium titanate whiskers, aluminum borate whiskers, wollastonite, talc, mica, graphite, calcium carbonate, dolomite, clay, glass flakes, glass beads, barium sulphate and titanium oxide, and the wholly aromatic liquid crystalline polyester resin composition may include one or two or more of these.

The wholly aromatic liquid crystalline polyester resin composition according to the present invention may comprise other resins than the wholly aromatic liquid crystalline polyester resin provided that the effect of the present invention is not compromised. Examples include polyethylene terephthalate, polyethylene naphthalate, polycarbonate, polyarylate, polyamide, polyimide, polyether sulphone, polyether ether ketone, polyphenylene sulfide, and polytetrafluoro ethylene, and the wholly aromatic liquid crystalline polyester resin composition may include one or two or more of these.

The wholly aromatic liquid crystalline polyester resin composition according to the present invention may comprise other additives, such as for example a colorant, a dispersant, a plasticizer, antioxidant, a flame retardant, a heat stabilizer, an ultraviolet ray absorbent, an antistat, and a surfactant, provided that the effect of the present invention is not compromised.

<Method for Manufacturing Wholly Aromatic Liquid Crystalline Polyester Resin Composition>

The wholly aromatic liquid crystalline polyester resin composition can be obtained by melt kneading the wholly aromatic liquid crystalline polyester resin to which a filler and the like is added by means of a Banbury mixer, a kneader, a single- or twin-screw extruder.

Based on 100 parts by weight of the above-described wholly aromatic polyester resin, 1 to 100 parts by weight of a liquid crystalline polyester resin other than the above-described wholly aromatic liquid crystalline polyester resin may be blended, having a melting point of 280° C. to 360° C. and a melting viscosity of $1 \times 10^2$ Pa·s or less at a shear rate of 1000 sec-1 when the temperature was melting point+20° C. By blending a liquid crystalline polyester resin other than the above-described wholly aromatic polyester resin, it is possible to control the balance between the formability and the mechanical strength while maintaining the heat resistance.

<Molded Article>

The molded article according to the present invention comprises the above-described wholly aromatic liquid crystalline polyester resin composition. The molded article of the present invention is excellent in shape stability, and for example the curvature of the molded article can be suppressed even when heat was applied in the reflow step.

The molded article according to the present invention can be produced by subjecting the above-described wholly aromatic liquid crystalline polyester resin composition to injection molding or extrusion molding. The molded article according to the present invention may be in a film-form, sheet-form, thread-form, nanofibers, and non-woven fabrics. A particular filming method includes inflation molding, melt extrusion molding, melt cast molding, and the like. The thus-obtained film may be a single-layered film consisted of the wholly aromatic polyester resin composition, or may be a multi-layered film with different materials. For the purpose of improving the shape stability and mechanical properties of the film subjected to melt extrusion molding and solution cast molding, a stretching process may be performed in a single screw or twin screw. Also, for the purpose of removing the anisotropy of the film, a thermal treatment may be performed.

<Electronic Part>

The electronic part according to the present invention comprises the above-described wholly aromatic liquid crystalline polyester resin composition. The electronic parts include for example, a connector for high-speed transmission, a CPU socket, a Board to Board connector, a circuit board, a flexible circuit board, a circuit board for lamination, a collision-avoidance radar, a RFID tag, a condenser, an inverter part, an insulation film, an insulation material of a secondary battery such as a lithium-ion battery, a speaker vibrating plate, a camera module, and the like. In particular, these electronic parts comprises a molded article (for example, an injection molded article) or a film consisted of the wholly aromatic liquid crystalline polyester resin composition.

EXAMPLES

The present invention is further described in details hereunder; however, the present invention is not limited by the Examples hereunder.

<Manufacture of Wholly Aromatic Liquid Crystalline Polyester Resin>

Example 1: Wholly Aromatic Liquid Crystalline Polyester Resin A

To a polymerization container with a stirring blade were added, 62 mol % of p-hydroxybenzoic acid (HBA), 10 mol % of 6-hydroxy-2-naphthoic acid (HNA), 8 mol % of hydroquinone (HQ), 6 mol % of 4,4'-dihydroxybiphenyl (BP), 14 mol % of terephthalic acid (TPA), and potassium acetate and magnesium acetate were fed as catalysts, then after performing depressurization-nitrogen injection of the polymerization container for 3 times, acetic acid anhydride (1.08 mol equivalent based on the entire hydroxyl groups) was further added, and the temperature was increased to 150° C., then acetylation reaction was performed for 2 hours under reflux state.

After completion of acetylation, the polymerization container in a state of which acetic acid was distilled out was subjected to temperature increase at 0.5° C./min, and when the temperature of the melt in the container reached 310° C., the polymer was taken out to be cooled and solidified. The obtained polymer was comminuted into the size which passes through a comb having a mesh size of 1.0 mm to obtain a prepolymer.

Then the obtained prepolymer as above was filled into a glass tube oven manufactured by Sibata Scientific Technology Ltd., increased the temperature of the heater from room temperature to 290° C. over 12 hours while rotating and subsequently maintained the temperature at 290° C. for 1 hour to perform solid phase polymerization. Then, the tank was left to heat release at room temperature while rotating to obtain wholly aromatic liquid crystalline polyester resin A. By using polarization microscope BH-2 manufactured by Olympus Corporation with a hot stage for microscope FP82HT manufactured by Mettler, the polyester specimen was heat melted on the microscope heating stage, and the liquid crystalline property was confirmed by the presence or non-presence of optical anisotropy.

Example 2: Wholly Aromatic Liquid Crystalline Polyester Resin B

Liquid crystalline polyester resin B was obtained in the similar manner as Example 1, except that the monomer feed was changed to HBA 62 mol %, HNA 10 mol %, HQ 10 mol %, BP 4 mol %, and TPA 14 mol %, and the liquid crystalline property was confirmed in the similar manner as above.

Example 3: Wholly Aromatic Liquid Crystalline Polyester Resin C

Liquid crystalline polyester resin C was obtained in the similar manner as Example 1, except that the monomer feed was changed to HBA 60 mol %, HNA 10 mol %, HQ 8 mol %, BP 7 mol %, and TPA 15 mol %, and the liquid crystalline property was confirmed in the similar manner as above.

Example 4: Wholly Aromatic Liquid Crystalline Polyester Resin D

Liquid crystalline polyester resin D was obtained in the similar manner as Example 1, except that the monomer feed was changed to HBA 62 mol %, HNA 10 mol %, HQ 8.5 mol %, BP 5.5 mol %, and TPA 14 mol %, and the liquid crystalline property was confirmed in the similar manner as above.

Example 5: Wholly Aromatic Liquid Crystalline Polyester Resin E

Liquid crystalline polyester resin E was obtained in the similar manner as Example 1, except that the monomer feed was changed to HBA 62 mol %, HNA 15 mol %, HQ 10.5 mol %, BP 1 mol %, and TPA 11.5 mol %, and the liquid crystalline property was confirmed in the similar manner as above.

Comparative Example 1: Wholly Aromatic Liquid Crystalline Polyester Resin F

Liquid crystalline polyester resin F was obtained in the similar manner as Example 1, except that the monomer feed was changed to HBA 62 mol %, HNA 4 mol %, HQ 5 mol %, BP 12 mol %, and TPA 17 mol %, and the liquid crystalline property was confirmed in the similar manner as above.

Comparative Example 2: Wholly Aromatic Liquid Crystalline Polyester Resin G

Liquid crystalline polyester resin G was obtained in the similar manner as Example 1, except that the monomer feed was changed to HBA 62 mol %, HNA 10 mol %, HQ 7 mol %, BP 7 mol %, and TPA 14 mol %, and the liquid crystalline property was confirmed in the similar manner as above.

Comparative Example 3: Wholly Aromatic Liquid Crystalline Polyester Resin H

Liquid crystalline polyester resin H was obtained in the similar manner as Example 1, except that the monomer feed was changed to HBA 62 mol %, HNA 10 mol %, HQ 4 mol %, BP 10 mol %, and TPA 14 mol %, and the liquid crystalline property was confirmed in the similar manner as above.

Comparative Example 4: Wholly Aromatic Liquid Crystalline Polyester ResinI

Liquid crystalline polyester resin I was obtained in the similar manner as Example 1, except that the monomer feed was changed to HBA 62 mol %, HNA 4 mol %, HQ 5 mol %, BP 12 mol %, and TPA 17 mol %, and the liquid crystalline property was confirmed in the similar manner as above.

Reference Example 1: Wholly Aromatic Liquid Crystalline Polyester Resin J

Liquid crystalline polyester resin J was obtained in the similar manner as Example 1, except that the monomer feed was changed to HBA 60 mol %, BP 20 mol %, TPA 15 mol %, isophthalic acid 5 mol %, and the liquid crystalline property was confirmed in the similar manner as above.

<Measurement of Melting Point and Supercooling Degree>

The melting points of the liquid crystalline polyester resins obtained in the Examples and Comparative Examples are measured by a differential scanning calorimeter (DSC) manufactured by Seiko Denshi Kogyo K. K.

The supercooling degree (° C.) is determined from "Tm (° C.)–Tc (° C.)", wherein Tc is the crystallization temperature determined from an endothermic peak obtainable when increasing the temperature from room temperature to 370° C. at a temperature increase rate of 20° C./min, and after the polymer is completely melted, decreasing the temperature to 50° C. at a rate of 10° C./min, and wherein Tm is the melting point determined from an endothermic peak obtainable when further increasing the temperature to 420° C. at a rate of 20° C./min. The measured results are summarized in Table 1.

<Manufacture of Wholly Aromatic Liquid Crystalline Polyester Resin Composition>

Potassium acetate and magnesium acetate as a catalyst were added to a monomer mixture in the same monomer composition ratio as Example 1, and by employing SUS316 as the material, was fed into a polymerization tank having a content volume of 6 L with a double helical stirring blade to obtain a prepolymer in the same condition as Example 1.

Then, the obtained prepolymer as above was filled into a solid phase polymerization device, and the heater temperature was increased at rotating speed of 5 rpm while nitrogen flown through, from room temperature to 150° C. over 1 hour, to 200° C. over 2.5 hours, and further to 250° C. over 3.5 hours. After maintaining the temperature for 2 hours at 250° C., the temperature was increased further to 290° C. over 6.5 hours, and maintained the temperature at 290° C. for 1 hour to perform solid phase polymerization. As a result, wholly aromatic liquid crystalline polyester resin A was obtained.

To 100 parts by weight of wholly aromatic liquid crystalline polyester resin A obtained as above were blended 36 parts by weight of fiber-like filler (manufactured by Central Glass Fiber Co., Ltd., product name: EFH150-01) and 7 parts by weight of plate-like filler (mica, manufactured by Yamaguchi Mica Co., Ltd., product name: AB-25S), and the product melt-kneaded by a twin-screw extruder was pelletized to obtain wholly aromatic liquid crystalline polyester resin composition A.

In addition, wholly aromatic liquid crystalline polyester resin composition J was obtained in a similar manner, except that wholly aromatic liquid crystalline polyester resin A was changed to wholly aromatic liquid crystalline polyester resin J as obtained in Reference Example 1.

<Mechanical Strength Test (Measurement of Bending Strength)>

The pellet of resin composition A obtained as above was subjected to injection molding with an injection molding machine (manufactured by Sumitomo Heavy Industries, Ltd., product name: SG-25) at a cylinder temperature of melting point+10° C., metallic mold temperature of 80° C., and injection rate of 100 mm/sec, and a bending test specimen (width 13 mm, length 130 mm, thickness 3 mm) was made in accordance with ASTM D790 to measure the bending strength.

TABLE 1

| | Composition ratio (mol %) | | | | | Evaluation of Performance | |
| --- | --- | --- | --- | --- | --- | --- | --- |
| | Structural unit (i) HBA | Structural unit (ii) HNA | Structural unit (iii) HQ | Structural unit (iv) BP | Structural unit (iv) TPA | Melting point (° C.) | Supercooling degree (° C.) |
| Example 1 | 62 | 10 | 8 | 6 | 14 | 324 | 36 |
| Example 2 | 62 | 10 | 10 | 4 | 14 | 343 | 51 |
| Example 3 | 60 | 10 | 8 | 7 | 15 | 320 | 44 |
| Example 4 | 62 | 10 | 8.5 | 5.5 | 14 | 329 | 36 |
| Example 5 | 62 | 15 | 10.5 | 1 | 11.5 | 327 | 49 |
| Comparative Example 1 | 62 | 4 | 5 | 12 | 17 | 332 | 25 |
| Comparative Example 2 | 62 | 10 | 7 | 7 | 14 | 317 | 32 |
| Comparative Example 3 | 62 | 10 | 4 | 10 | 14 | 286 | 20 |
| Comparative Example 4 | 30 | 10 | 16 | 14 | 15 | 299 | 43 |

In addition, a test specimen was made in a similar manner by using resin composition J to measure the bending strength. The measured results are summarized in Table 2.

<Blister Resistant Property Test (Measurement of Blister-proof Temperature)>

The pellet of resin composition A obtained as above was subjected to injection molding with an injection molding machine (manufactured by Sodick, product name: LD10EH2) at a cylinder temperature of melting point+10° C., metallic mold temperature of 80° C., and injection rate of 150 mm/sec, and a test specimen (width 10 mm, length 60 mm, thickness 0.4 mm) was made in accordance with JIS K7160 2 shape.

In addition, a test specimen was made in a similar manner by using resin composition J. The test specimen obtained as above was left to stand for 30 minutes in an air oven maintained at a given temperature, and the blister-proof temperature was determined from the maximum temperature at which no blister and no deformation occur at the surface of the test specimen. The measured results are summarized in Table 2.

<Measurement of Amount of Curvature>

Figure 2:
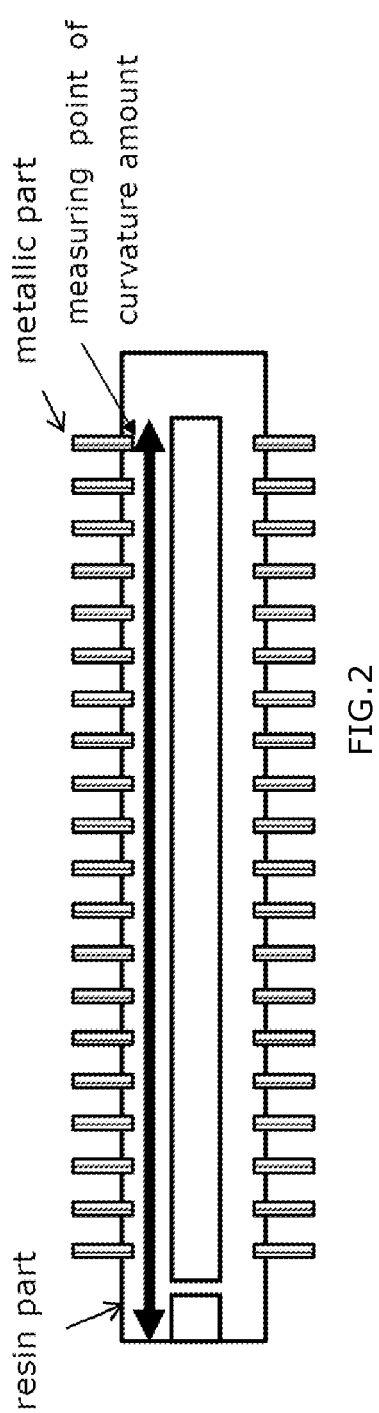
FIG. 2 is a figure of the bottom face of the molded article for measurement of amount of curvature as produced in the Example.

The pellet of resin composition A obtained as above was subjected to insert molding with an injection molding machine (manufactured by Sodick, product name: LP20) at a cylinder temperature of melting point+10° C., metallic mold temperature of 100° C., and injection rate of 150 mm/sec, and the resin was integrated with the metal part to obtain a molded article in the shape as shown in FIGS. 1 and 2. In addition, a molded article was obtained in the similar manner by using resin composition J. FIG. 1 shows the upper face and the side face of the obtained molded article and FIG. 2 shows the bottom face. The numerical values of the dimension are in mm.

The molded article obtained as above was left to stand for 10 minutes in an air oven kept at the temperature of 260° C., and the amount of curvature of the molded article after being heated was measured with a one-shot 3D microscope (manufactured by Keyence Corporation, product name: VR-3100). Curvature was measured, in which the amount of curvature was determined from the difference obtained by measuring with the 3D microscope the directed part shown in FIG. 2 of the highest position and the lowest position from the top when the molded article was placed with its bottom face (the face to be measured of curvature) facing upward. The measured results are summarized in Table 2. The better the shape stability, the smaller is the amount of curvature, and preferably, the amount of curvature is 40 μm or less.

TABLE 2

| Molded article | Bending strength (mpa) | Blister-proof temperature (° C.) | Amount of curvature (μm) |
|---|---|---|---|
| Resin composition A (Inventive) | 165 | 280 | 30 |
| Resin composition J (Reference Example) | 155 | 270 | 45 |

<Measurement of Weld Strength>

Figure 3:
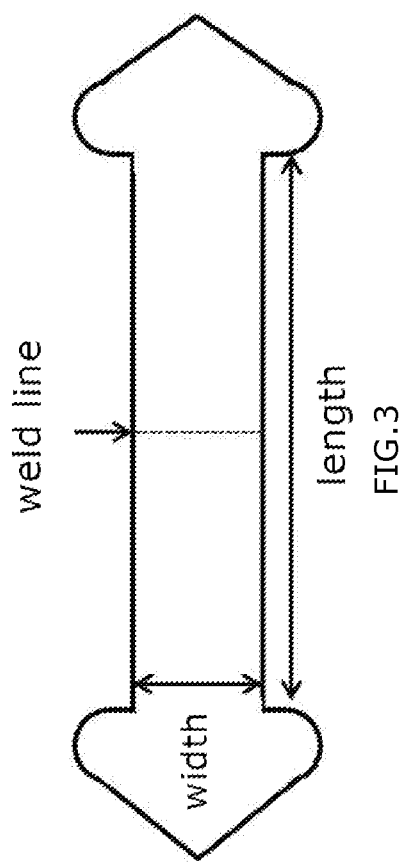
FIG. 3 is a test specimen for measurement of weld strength as produced in the Example.

The pellet of resin composition A obtained as above was subjected to injection molding with an injection molding machine (manufactured by Sumitomo Heavy Industries, Ltd., product name: SE30DU) at a cylinder temperature of melting point+10° C., metallic mold temperature of 100° C., and injection rate of 250 mm/sec, and a test specimen (width 14.6 mm, length 48.0 mm, thickness 0.35 mm) as shown in FIG. 3 was made. In addition, a test specimen was obtained in the similar manner by using resin composition J.

The welded part of the test specimen obtained as above was pressed from the upper side under the following conditions of three-point bend test, and the stress when the welded part breaks was measured. The measured results are summarized in Table 3.

(Conditions of Three-Point Bend Test)
Distance Between Spans=25 mm
Jig R=10 mm
Falling Speed=1.27 mm/min

TABLE 3

| Molded article | Weld strength (MPa) |
|---|---|
| Resin composition A (Inventive) | 36 |
| Resin composition J (Reference Example) | 33 |

The invention claimed is:

1. A wholly aromatic liquid crystalline polyester resin, wherein
the wholly aromatic liquid crystalline polyester resin comprises a polymer produced by polymerization of monomers giving structural units represented by the following formulae (I), (II), (III), (IV), and (V):

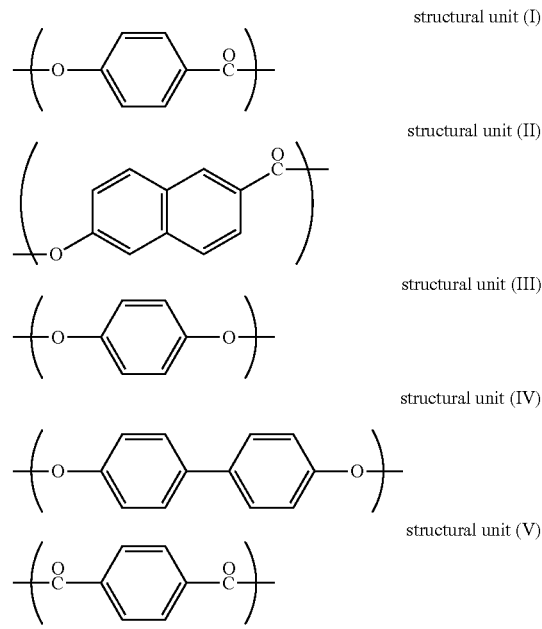

as essential structural units, wherein a composition ratio (mol %) of the structural units (I) to (V) in the wholly aromatic liquid crystalline polyester resin satisfies the following conditions:
50 mol %≤structural unit (I)≤75 mol %;
6 mol %≤structural unit (II)≤20 mol %;
1 mol %≤structural unit (III)≤21.5 mol %;
0.5 mol %≤structural unit (IV)≤10.5 mol %;
2.5 mol %≤structural unit (V)≤22 mol %; and
structural unit (III)>structural unit (IV).

2. The wholly aromatic liquid crystalline polyester resin according to claim 1, wherein the composition ratio (mol %) of the structural units (I) to (V) in the wholly aromatic liquid crystalline polyester resin satisfies the following conditions:

55 mol %≤structural unit (I)≤70 mol %;
7 mol %≤structural unit (II)≤17 mol %;
3 mol %≤structural unit (III)≤18 mol %;
1 mol %≤structural unit (IV)≤9 mol %; and
4 mol %≤structural unit (V)≤19 mol %.

3. The wholly aromatic liquid crystalline polyester resin according to claim 1, wherein
a melting point is from 320° C. to 355° C.

4. The wholly aromatic liquid crystalline polyester resin according to claim 1, wherein
a supercooling degree is 35° C. or more.

5. A wholly aromatic liquid crystalline polyester resin composition comprising the wholly aromatic liquid crystalline polyester resin according to claim 1 and an inorganic filler.

6. The wholly aromatic liquid crystalline polyester resin composition according to claim 5, wherein
the inorganic filler is a fiber-like filler and/or a plate-like filler.

7. The wholly aromatic liquid crystalline polyester resin composition according to claim 5, wherein
a content of the inorganic filler is 100 parts by weight or less based on 100 parts by weight of the wholly aromatic liquid crystalline polyester resin comprised in the wholly aromatic liquid crystalline polyester resin composition.

8. A molded article comprising the wholly aromatic liquid crystalline polyester resin composition according to claim 5.

9. An electronic part comprising the wholly aromatic liquid crystalline polyester resin composition according to claim 5.

10. A wholly aromatic liquid crystalline polyester resin composition comprising the wholly aromatic liquid crystalline polyester resin according to claim 3 and an inorganic filler.

11. The wholly aromatic liquid crystalline polyester resin composition according to claim 10, wherein
the inorganic filler is a fiber-like filler and/or a plate-like filler.

12. The wholly aromatic liquid crystalline polyester resin composition according to claim 10, wherein
a content of the inorganic filler is 100 parts by weight or less based on 100 parts by weight of the wholly aromatic liquid crystalline polyester resin comprised in the wholly aromatic liquid crystalline polyester resin composition.

13. The wholly aromatic liquid crystalline polyester resin composition according to claim 6, wherein
a content of the inorganic filler is 100 parts by weight or less based on 100 parts by weight of the wholly aromatic liquid crystalline polyester resin comprised in the wholly aromatic liquid crystalline polyester resin composition.

14. The wholly aromatic liquid crystalline polyester resin composition according to claim 11, wherein
a content of the inorganic filler is 100 parts by weight or less based on 100 parts by weight of the wholly aromatic liquid crystalline polyester resin comprised in the wholly aromatic liquid crystalline polyester resin composition.

15. A molded article comprising the wholly aromatic liquid crystalline polyester resin composition according to claim 6.

16. A molded article comprising the wholly aromatic liquid crystalline polyester resin composition according to claim 7.

17. A molded article comprising the wholly aromatic liquid crystalline polyester resin composition according to claim 13.

18. An electronic part comprising the wholly aromatic liquid crystalline polyester resin composition according to claim 6.

19. An electronic part comprising the wholly aromatic liquid crystalline polyester resin composition according to claim 7.

20. An electronic part comprising the wholly aromatic liquid crystalline polyester resin composition according to claim 13.

* * * * *